(12) United States Patent
Shimozawa et al.

(10) Patent No.: US 7,233,564 B2
(45) Date of Patent: Jun. 19, 2007

(54) OPTICAL DISK APPARATUS

(75) Inventors: Kenji Shimozawa, Tokorozawa (JP);
Hiroshi Konuma, Tokyo (JP);
Hiroyuki Shindo, Chofu (JP);
Masanori Tei, Iruma (JP); Takahiro Yamamoto, Nishitokyo (JP)

(73) Assignee: TEAC Corpration, Musashino-shi (JP)

( * ) Notice: Subject to any disclaimer, the term of this patent is extended or adjusted under 35 U.S.C. 154(b) by 515 days.

(21) Appl. No.: 10/430,613

(22) Filed: May 5, 2003

(65) Prior Publication Data
US 2003/0210632 A1 Nov. 13, 2003

(30) Foreign Application Priority Data
May 8, 2002 (JP) .............................. 2002-132285
May 14, 2002 (JP) .............................. 2002-138233

(51) Int. Cl.
*G11B 7/00* (2006.01)
(52) U.S. Cl. ................................... 369/116; 369/112.28
(58) Field of Classification Search ................... None
See application file for complete search history.

(56) References Cited
U.S. PATENT DOCUMENTS
2002/0036971 A1* 3/2002 Motegi et al. .......... 369/112.19
2003/0223340 A1* 12/2003 Miyake et al. ........... 369/53.26

FOREIGN PATENT DOCUMENTS
JP 7-230628 8/1995
(Continued)

OTHER PUBLICATIONS
English Translation of JP 2000-331365.*
(Continued)

*Primary Examiner*—Thang V. Tran
*Assistant Examiner*—Lixi Chow
(74) *Attorney, Agent, or Firm*—Christensen O'Connor Johnson Kindness PLLC

(57) ABSTRACT

An optical disk apparatus which records/reproduces data on/from a plurality of types of optical disks. The optical disk apparatus has a plurality of laser diodes. Two laser light rays emanating from two laser diodes are coupled together by means of a coupling prism. The thus-coupled laser light is radiated onto an optical disk. A photodetector is disposed in close proximity to the coupling prism. The coupling prism guides, to the photodetector, a laser light component of at least one laser light ray of the two laser light to be coupled together, the component having not been radiated onto the optical disk on an optical path. Laser light which is not radiated onto the optical disk on the optical path includes diffracted light other than a main beam emanating from the laser diode or laser beam which has not been subjected to coupling at the coupling surface of the coupling prism. When laser light for a CD is caused to pass through the coupling surface and laser light for a DVD is reflected by the same, the CD laser light which is reflected from the coupling surface or the DVD laser light which passes through the coupling surface is guided to the photodetector. The power of a main beam of the laser light is controlled in accordance with the power of the laser light detected by the photodetector.

17 Claims, 11 Drawing Sheets

FOREIGN PATENT DOCUMENTS

| | | |
|---|---|---|
| JP | 10320822 A | 12/1998 |
| JP | 2000-251312 A | 9/2000 |
| JP | 2000-331365 | 11/2000 |
| JP | 2001-143305 | 5/2001 |
| JP | 2001-344804 | 12/2001 |

OTHER PUBLICATIONS

Office Action issued on Nov. 3, 2006, in corresponding Chinese App. No. 2005-10084321.5. (JP Pub. Nos. 2000-251312 and 10-320822, as cited in the Chinese Office Action, were previously cited in the Information Disclosure Statement filed on Dec. 29, 2006).

* cited by examiner

OPTICAL DISK APPARATUS

BACKGROUND OF THE INVENTION

1. Field of the Invention

The invention relates to an optical disk apparatus, and more particularly, to an optical disk apparatus which subjects a plurality of optical disks to recording and reproduction.

2. Related Art

There has recently been developed an optical disk apparatus which has a plurality of light sources for emitting laser lights of different wavelengths and subjects a plurality of types of optical disks to recording and reproduction through use of the plurality of laser lights. Examples of such an optical disk apparatus include an optical disk apparatus which subjects a CD and a DVD to recording and reproduction; an apparatus capable of reproducing data from a CD and a DVD; an apparatus which records and reproduces data on and from a CD and which reproduces data from a DVD; and an apparatus capable of recording and reproducing data from and on a CD and a DVD. An apparatus which records and reproduces data on and from a CD and reproduces data from a DVD is taken as an example. The apparatus has two light sources: that is, a light source for a CD (simply called a "CD light source") and another light source for a DVD (simply called a "DVD light source"). Laser light of recording power for recording data on a CD-R or a CD-RW is emitted from the CD light source. Further, laser light of reproduction power is emitted from the DVD light source. Here, the laser light emitted from the CD light source has a wavelength of about 780 nm, and the laser light emitted from the DVD light source has a wavelength of about 650 nm.

In order to record data on the CD-R, the recording power of the laser light emanating from the CD light source must be controlled to a desired value. For instance, in the case of a CD-R, a recording film is exposed to laser light, and a portion of the recording film is fused and evaporated by the thermal energy of the laser light, thereby forming a pit. Consequently, a deficiency or excess of recording power results in formation of a geometry failure, thereby deteriorating recording quality. Therefore, monitoring of intensity of the laser light of recording power, and feedback control for controlling the intensity of the laser light to a desired value are required.

Feedback control is achieved by, for example, providing a photodetector in the vicinity of the CD light source, providing a mirror in an optical path of the laser light emanating from the CD light source, causing the mirror to reflect a portion of the laser light so as to guide the reflected laser light to the photodetector, and detecting the intensity of the thus-guided laser light. More specifically, an optical system (optical pickup) is formed from a laser diode (LD), a collimator lens for converting into collimated light laser light emanating from the LD, and a mirror for reflecting the light emanating from the collimator lens toward an objective lens. A mirror is disposed on an optical path between the LD and the collimator lens, to thereby reflect and guide to a photodetector a portion of the laser light emanating from the LD. The power of the laser light that has been converted into an electric signal by the photodetector is supplied to a controller and an LD driver, thereby adjusting the value of a drive current for the LD driver.

However, in the case of the configuration in which a portion of the light traveling along the optical path is reflected and guided toward the photodetector, the light enters the objective lens, so that the power of the laser light to be radiated onto the optical disk decreases. Further, an optical component (i.e., a mirror) which is not essentially required for recording and reproducing data must be disposed on an optical path, thereby entailing an increase in the number of components, an increase in the size of the optical pickup, and a cost hike.

SUMMARY OF THE INVENTION

The invention provides an optical disk apparatus capable of detecting power of laser light with a simple configuration.

An optical disk apparatus of the invention comprises a plurality of light sources for emitting light rays of different wavelengths; coupling means for coupling at least two light rays from among light rays emanating from the plurality of light sources; light collecting means for collecting light emanating from the coupling means and guiding the collected light to an optical disk; light receiving means disposed in the vicinity of the coupling means; and adjustment means for adjusting the power of at least one of the plurality of light sources in accordance with the intensity of light received by the light receiving means, wherein the coupling means guides, to the light receiving means, light which emanates from at least one of two light sources whose light rays are to be coupled together and which has not reached the light collecting means on an optical path. The coupling means guides the light emanating from the light source to the light receiving means. Hence, the number of components can be minimized.

In one embodiment, the coupling means guides, to the light receiving means, diffracted light which emanates from at least one of two light sources whose light rays are to be coupled together. Here, the plurality of light sources is, for example, a light source for a CD and a light source for a DVD. The coupling means couples CD laser light emanating from the CD light source and DVD laser light emanating from the DVD light source and guides, to the light receiving means, diffracted light emanating from the CD light source and/or diffracted light emanating from the DVD light source.

In another embodiment, the coupling means has a coupling surface which permits passage of one of two light rays emanating from two light sources whose light rays are to be coupled together and reflects the other light ray, to thereby performing coupling operation, and the coupling means guides, to the light receiving means, light of the one light ray having been reflected from the coupling surface and/or light of the other light ray having passed through the coupling surface. Here, the plurality of light sources is, for example, a light source for a CD and a light source for a DVD. The coupling means has a coupling surface which permits passage of CD laser light emanating from the CD light source and reflects DVD laser light emanating from the DVD light source, to thereby perform coupling operation, and the coupling means guides, to the light receiving means, laser light of the CD laser light reflected from the coupling surface and/or laser light of the DVD laser light having passed through the coupling surface.

The optical disk apparatus of the invention can be applied to an optical disk apparatus which records/reproduces data on/from a plurality of types of optical disks.

The invention is clearly construed by reference to the following embodiments. However, the scope of the invention is not limited to the following embodiments.

DETAILED DESCRIPTION OF THE PREFERRED EMBODIMENTS

An embodiment of the invention will be described hereinbelow by taking, as an example, an optical disk apparatus which has a light source for a CD and another light source for a DVD and which subjects a CD to recording and reproduction and a DVD to reproduction.

Figure 1:
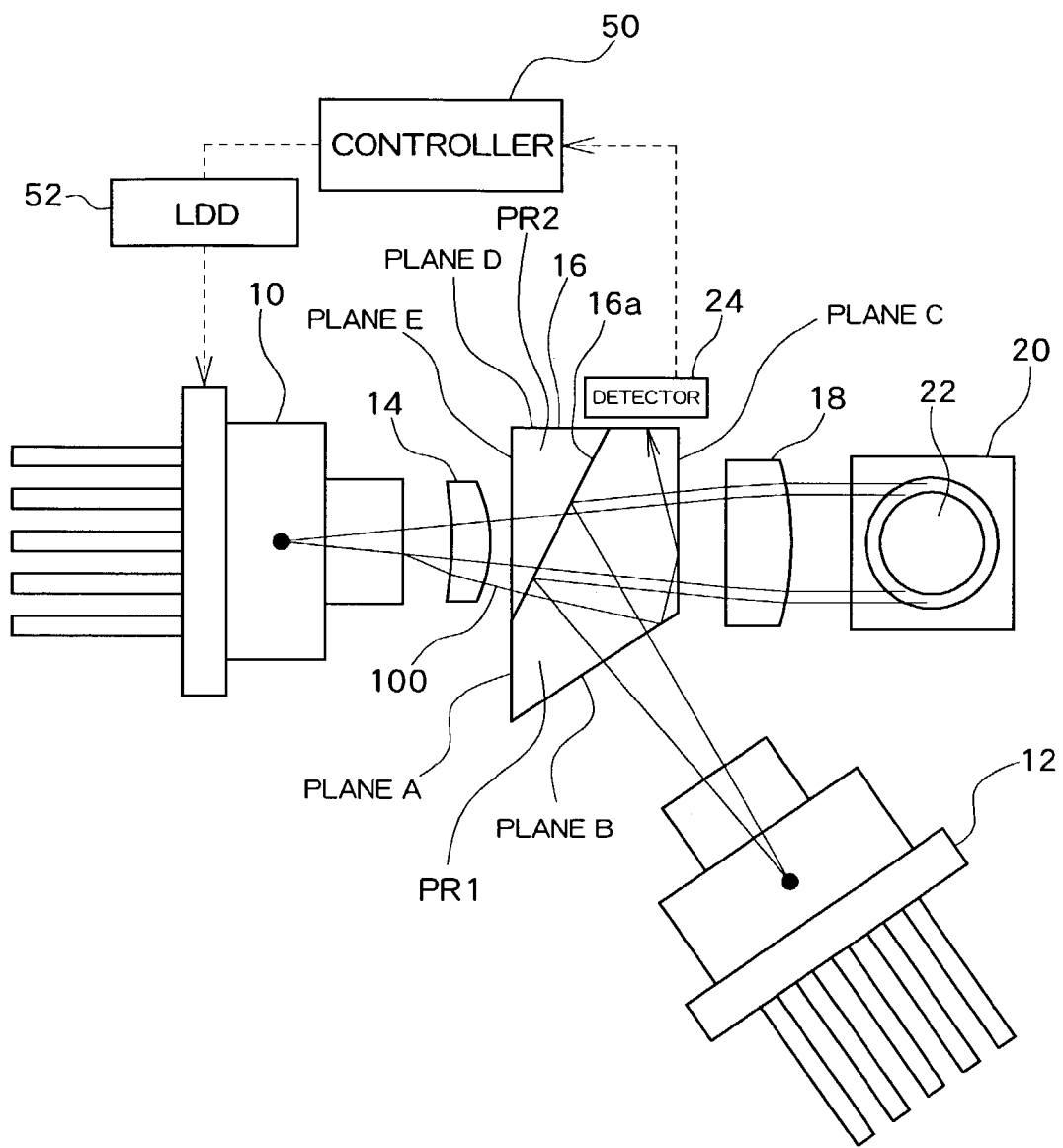
FIG. 1 is a block diagram showing an optical pickup to be incorporated into an optical disk apparatus.

FIG. 1 shows the configuration of an optical pickup provided in an optical disk apparatus. A laser diode 10 for a CD (hereinafter called a "CD LD 10") and another laser diode 12 for a DVD (hereinafter called a "DVD LD 12") are provided as light sources. A long-wave laser light (having a wavelength of 780 nm) is emitted from the CD LD 10, and a short-wave laser light (having a wavelength of 650 nm) is emitted from the DVD LD 12. When data are recorded/reproduced on/from a CD, the CD LD 10 is driven. At the time of reproduction of data, laser power is controlled to reproduction power. At the time of recording of data, the laser power is controlled to recording power. More specifically, the CD LD 10 is driven by a laser diode driver (LDD) 52 in accordance with record data supplied from a host machine, whereupon the CD LD 10 emits laser light of reproduction/recording power. A recording pulse is set according to a predetermined strategy. For instance, 3 terabytes (T) of data are recorded in the form of a single pulse, and 4T or more of data are recorded in the form of a multi-pulse. Test data are written into a predetermined area [PCA (Power Calibration Area)] of the CD on a trial basis, and recording power is optimized on the basis of quality of reproduced data. The thus-optimized recording power is stored in a controller 50 of the optical disk apparatus, and a drive current for the LDD 52 is controlled such that the optimal recording power is obtained. When data are reproduced from the DVD, the DVD LD 12 is driven.

The long-wave laser light emanating from the CD LD 10 enters a coupling lens 14 for controlling magnification of a CD system and a plane E of a dichroic prism 16, as well. In the meantime, the short-wave laser light emanating from the DVD LD 12 enters a plane B of the dichroic prism 16. The CD LD 10 and the DVD LD 12 are provided in the same plane so as to form a predetermined angle.

The dichroic prism 16 is made by cementing two prisms PR1, PR2 and assumes a trapezoidal shape as illustrated when viewed from above. An outer surface of the dichroic prism 16 is made up of planes A through E. The planes A and E are coplanar. However, the plane A constitutes the prism PR1, and the plane E constitutes the prism PR2, and therefore they are given different symbols. A mating surface existing between the two prisms PR1, PR2 constitutes a dichroic surface 16a. The dichroic surface 16a has a unique reflection characteristic against wavelengths; a dichroic film which permits passage of light of a certain wavelength and reflects light of the other wavelengths is formed on the dichroic surface 16a. In the embodiment, the dichroic surface (i.e., the dichroic film) 16a has a characteristic of permitting passage of light having a wavelength of 780 nm and reflecting light having a wavelength of 650 nm. The long-wave laser light (i.e., laser light for a CD, which will be hereinafter simply called "CD laser light") having entered the dichroic prism 16 passes through the dichroic surface 16a, to thereby enter a collimator lens 18. The short-wave laser light (i.e., laser light for a DVD which will be hereinafter simply called "DVD laser light") having entered the dichroic prism 16 is reflected by the dichroic surface 16a, to thereby enter the collimator lens 18. In this way, the dichroic prism 16 permits passage of the CD laser light and reflects the DVD laser light, thereby coupling the laser lights together while an optical path of the CD laser light is aligned with that of the DVD laser light. The CD laser light or DVD laser light having entered the collimator lens 18 is reflected by a reflection mirror 20 and guided to an objective lens 22. A CD or a DVD is disposed at a position ahead of the objective lens 22.

The laser light (i.e., a main beam) having entered the objective lens 22 travels along the following optical path.

CD Laser Light:
The LD 10→the coupling lens 14→the dichroic prism 16→the collimator lens 18→4 the reflection mirror 20→the objective lens 22

DVD Laser Light:
The LD 12→the dichroic prism 16→the collimator lens 18→the reflection mirror 20→the objective lens 22

If the CD LD 10 is, for example, a hologram unit having a diffraction grating, diffracted light 100 which does not enter the objective lens 22 is also present in the laser light emanating from the LD 10 in addition to laser light which is to enter the objective lens 22. The diffracted light 100 also enters the dichroic prism 16 after having passed through the coupling lens 14. The diffracted light 100 is laser light which does not contribute to recording/reproduction of data. In the embodiment, the power of the CD laser light is detected by use of the diffracted light 100.

Specifically, the diffracted light 100 emanating from the CD LD 10 is subjected to total reflection within the dichroic prism 16 and guided to a specific plane of the dichroic prism 16. Further, the diffracted light is caused to pass through the specific plane and guided to a-photodetector 24 disposed in close proximity to that specific plane. In the drawing, the photodetector is disposed in close proximity to the plane D. The diffracted light 100 enters the plane E, reaches the plane B, is subjected to total reflection at the planes B, C, reaches the plane D, and arrives at the photodetector 24 after having passed through the plane D. Here, a power ratio of the main beam to the diffracted light 100 is known, and the power of the main beam is computed from the power of the diffracted light 100 received by the photodetector 24. Thus, the laser power is detected through use of the diffracted light 100 which does not contribute to recording/reproduction of data instead of reflecting a portion of the main beam having entered the objective lens 22, thereby enabling detection of laser power without involvement of a decrease in the power of the main beam having entered the objective lens. Further, an additional reflection mirror to be used for guiding the diffracted light 100 to the photodetector 24 is not provided. The diffracted light 100 is guided to the photodetector 24 by use of the dichroic prism 16 that is to be used for coupling together the CD laser light emanating from the CD LD 10 and the DVD laser light emanating from the DVD LD 12. Hence, the number of components and the cost are maintained. Further, the photodetector 24 can be disposed in close proximity to the dichroic prism 16. Hence, an increase in the size of the optical pickup section, which would otherwise be caused by placing the photodetector 24 at another position, can also be suppressed. The photodetector 24 may be disposed so as to remain in contact with or be spaced apart from the plane D of the dichroic prism 16.

Figure 2:
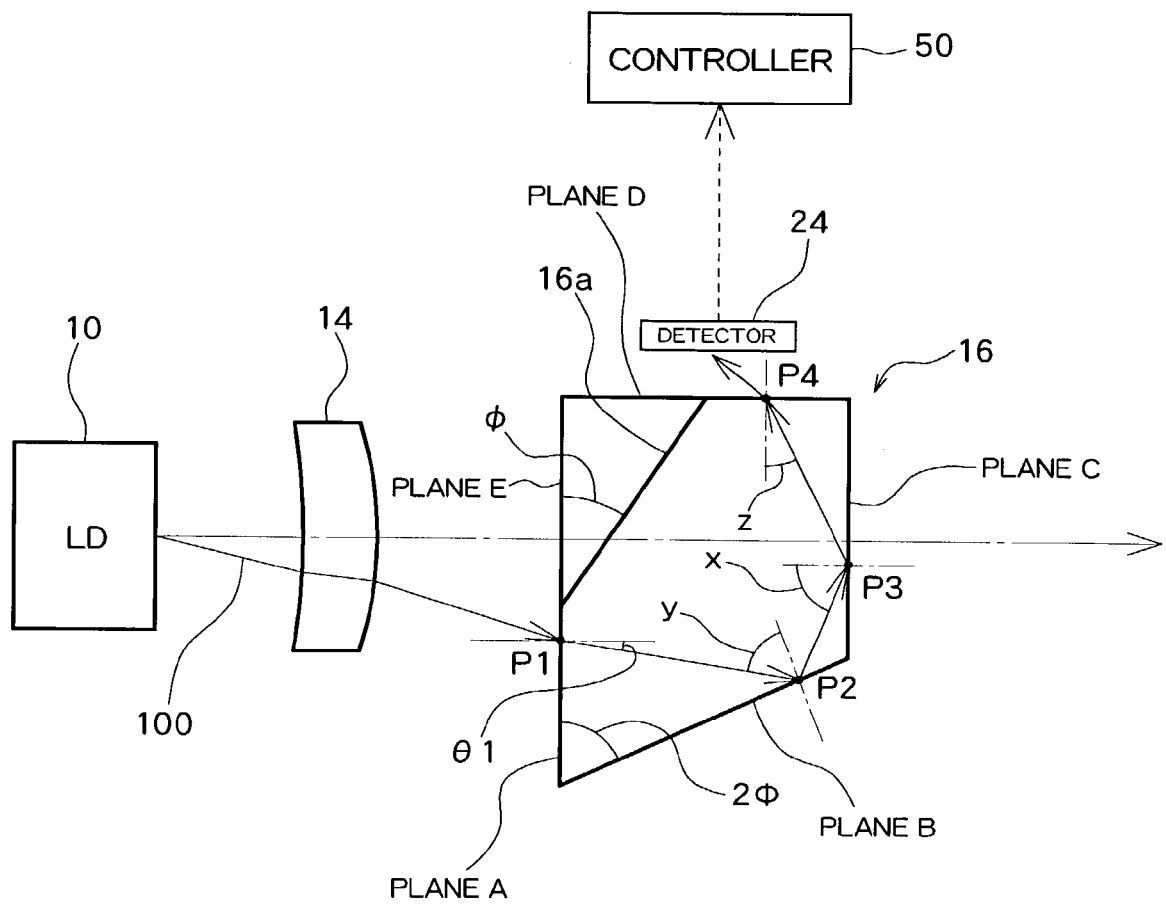
FIG. 2 is a descriptive view of an optical path of laser light for a CD within the coupling prism shown in FIG. 1.

FIG. 2 shows an optical path for the diffracted light 100 (i.e., positive first-order diffracted light) shown in FIG. 1. The diffracted light 100 incident on a position P1 of the dichroic prism 16 is refracted at an angle θ1, to thereby further enter the prism. The diffracted light 100 incident on the plane E reaches the plane B at a position P2. An incidence angle of the diffracted light 100 with respect to the plane B at this time is assumed to be "y." After having undergone total reflection at the position P2, the diffracted light 100 reaches the plane C at a position P3. An incidence angle of the diffracted light 100 with respect to the plane C is assumed to be "x." After having undergone total reflection at the position P3, the diffracted light 100 reaches the plane D at a position P4. An incidence angle of the diffracted light 100 at this time is taken as "z." After having reached the plane D and passed through the position P4, the diffracted light 100 enters the photodetector 24. The diffracted light is then converted into an electric signal and output to the controller 50.

Provided that an angle formed between the dichroic surface 16a of the dichroic prism 16 and the plane E is taken as φ and an angle formed between the plane A and the plane B is taken as 2φ, the following equations are obtained.

$$x = 180° - 4 \cdot \phi + \theta1 \quad (1)$$
$$y = 2 \cdot \phi - \theta1$$
$$z = 4 \cdot \phi - \theta1 - 90°$$

The incident diffracted light 100 undergoes total reflection at the position P2 under the condition that the incident angle "y" of the diffracted light satisfies $$y \geq \sin^{-1}(n2/n1) \quad (2),$$

where n1 denotes the refractive index of the dichroic mirror 16, and n2 denotes the refractive index of air. When, for example, BK7 glass is used as the dichroic prism 16, the refractive index of the glass is n1=1.51. Hence, if "y" assumes a value of $\sin^{-1}(1/1.51)=41.5°$ or more, the diffracted light 100 undergoes total reflection at the plane B and reaches the plane C. As in the case of the plane B, the diffracted light undergoes total reflection at the plane C under the condition that the incident angle "x" of the diffracted light satisfies $$x \geq \sin^{-1}(n2/n1) \quad (3).$$

Meanwhile, after having undergone total reflection at the plane C, the diffracted light 100 passes through the plane D under the condition that the incident angle "z" of the diffracted light satisfies $$z < \sin-1(n2/n1) \quad (4).$$

The expressions determine the angle φ which the dichroic mirror 16 forms and the incident angle θ1 to be satisfied by the diffracted light 100. In the embodiment, for example, the following settings are employed.

Wavelength λ=780 nm;
P-polarized;
Refractive index n2=1.51 (BK7);
φ=27.5°
θ1=6.6°
y=48.4° (totally reflected)
x=76.6° (totally reflected)
z=13.4° (transmitted)

As mentioned above, the diffracted light 100 can be guided to the photodetector 24 by use of the dichroic prism 16. Power of the LD 10 can be adjusted to a desired value through feedback control. In the embodiment, the photodetector 24 is spaced away from the plane D of the dichroic prism 16. However, when the photodetector 24 is disposed so as to remain in contact with the plane D of the dichroic prism 16, after having reached the plane D, the diffracted light 100 enters the photodetector 24 without being subjected to total reflection under the following condition:

$$z < \sin^{-1}(n2/n3) \quad (5).$$

Here, n3 denotes the refractive index of a resin section of the photodetector 24. The refractive index n3 of the resin section of the photodetector 24 usually assumes a value of 1.55 or thereabouts. Hence, the resin section is higher in refractive index than BK7 of the dichroic prism 16. Consequently, in this case, the diffracted light 100 is guided to the photodetector 24 without being subjected to total reflection at the plane D at all times.

In the embodiment, the diffracted light 100 is guided to the photodetector 24 after having been subjected to total reflection at the planes B, C other than the dichroic surface 16a. Hence, the diffracted light 100 can enter the photodetector 24 without involvement of a loss in quantity of light, which would otherwise be caused by the dichroic surface 16a.

Figure 3:
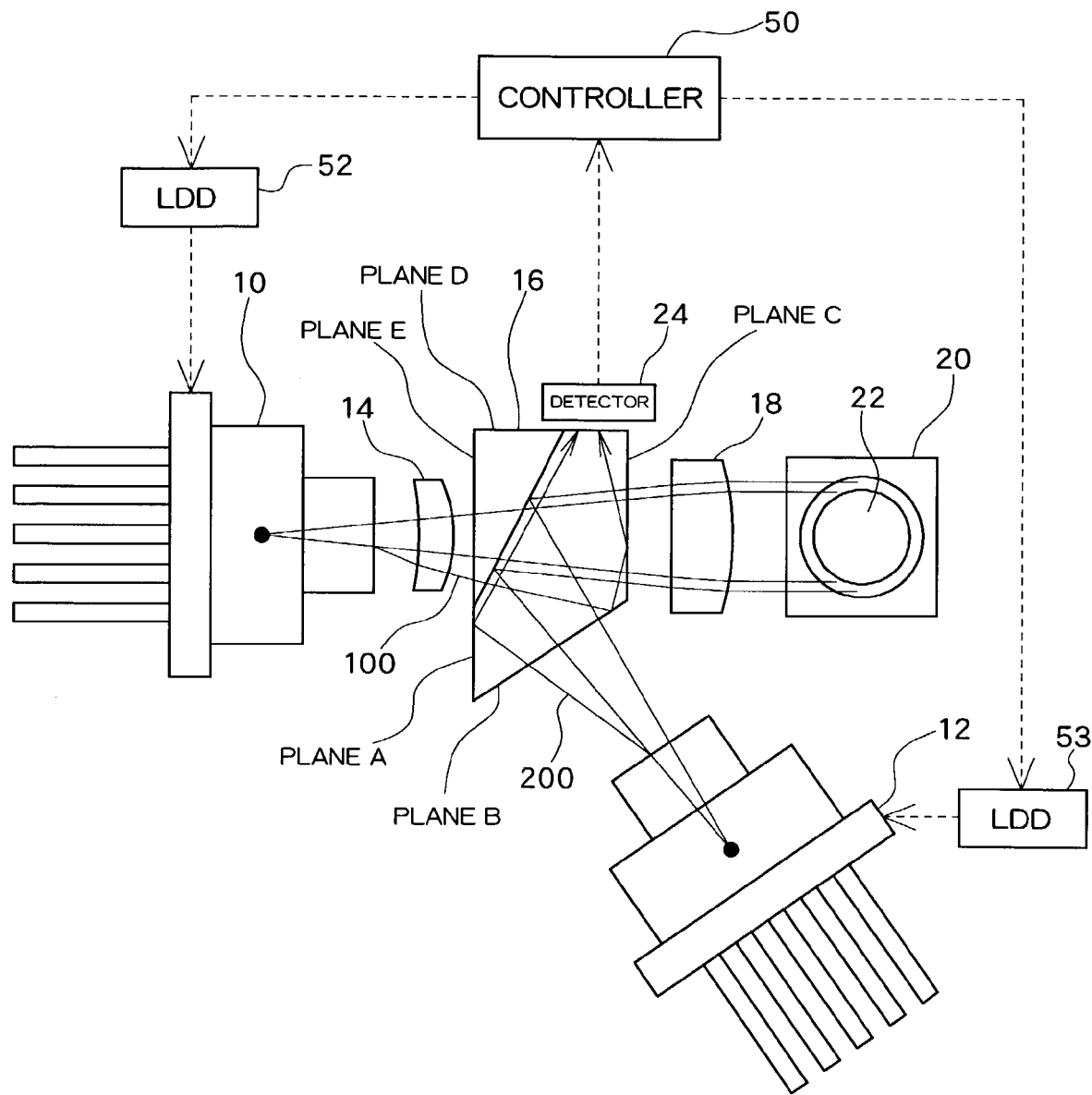
FIG. 3 is a descriptive view of an optical path of laser light for a DVD within the coupling prism shown in FIG. 1.

FIG. 3 shows another configuration of the optical pickup section of the optical disk apparatus. The optical disk apparatus subjects a CD to recording/reproduction and a DVD to recording/reproduction.

Diffracted light 200 emanating from the DVD LD 12 as well as the diffracted light 100 emanating from the CD LD 10 are guided to the photodetector 24 through use of the dichroic prism 16, whereby the power of the CD laser light and the power of the DVD laser light are detected and controlled by the single photodetector 24.

The diffracted light 100 emanating from the CD LD 10 enters the dichroic prism 16 by way of the plane E thereof, undergoes total reflection at the planes B, C, passes through the plane D, and is guided to the photodetector 24. The diffracted light 200 emanating from the DVD LD 12 enters the dichroic prism 16 by way of the plane B thereof, undergoes total reflection at the plane A, passes through the plane D, and is guided to the photodetector 24.

As mentioned previously, the diffracted light 200 undergoes total reflection under the condition that the incident angle of the diffracted light with respect to the plane A satisfies $\sin^{-1}(n2/n1)$ or more (i.e., 41.5° C. or more when the dichroic prism 16 is formed from BK7). Layout of the plane A or the DVD LD 12 is determined so as to satisfy this condition. Layout of the DVD LD 12 or formation of the plane A of the dichroic prism 16 is determined so as to satisfy the above-described condition. Here, the plane A also acts as a plane to be used for determining the incident angle θ1 of the diffracted light 100. Hence, this must be taken into consideration at the time of designing the optical pickup. For instance, settings are effected so as to satisfy the condition by means of finely adjusting the layout of the DVD LD 12 after the layout of the CD LD 10 and the shape and position of the dichroic prism 16 have been determined.

Conditions to be satisfied by the respective planes of the dichroic prism 16 are as follows:
Plane A: causes total reflection of the diffracted light 200,
Plane B: causes total reflection of the diffracted light 100,
Plane C: causes total reflection of the diffracted light 100, and
Plane D: permits passage of the diffracted light 100 and the diffracted light 200.

When data are recorded on a CD, the CD LD 10 is driven. The diffracted light 100 emanating from the CD LD 10 is detected by the photodetector 24, and an electric signal corresponding to the quantity and intensity of received light is supplied to the controller 50. The controller 50 computes power of the main beam of the CD laser light from a power ratio of the main beam to the diffracted light 100, the ratio being stored in the memory beforehand, thereby controlling the LDD 52 such that desired recording power is attained. In accordance with the control signal output from the controller 50, the LDD 52 increases or decreases a drive current for the CD LD 10, thereby acquiring desired recording power through feedback control. When data are recorded on a DVD, the DVD LD 12 is driven. The diffracted light 200 emanating from the DVD LD 12 is detected by the photodetector 24. An electric signal corresponding to the intensity of received light is supplied to the controller 50. The controller 50 computes the power of the main beam of the DVD laser light through use of the power ratio of the main beam to the diffracted light 200, the ratio having been stored in the memory in advance, thereby controlling a LDD 53 so as to acquire desired recording power. In accordance with the control signal output from the controller 50, the LDD 53 increases or decreases the drive current for the DVD LD 12, thereby acquiring desired recording power through feedback control. The LDD 52 and the LDD 53 maybe embodied by a common, single LDD. The desired recording power of the CD LD 10 and the desired recording power of the DVD LD 12 are recorded in memory of the controller 50 through OPC (Optical Power Calibration) processing to be performed prior to recording operation.

This configuration also enables detection of power of the main beam through use of the diffracted light 100 and the diffracted light 200, neither contributing to recording/reproduction of data, instead of reflecting the laser light of the main beam entering the objective lens 22. Further, the laser light rays emanating from the two light sources are guided to the single photodetector 24 through use of the single dichroic prism 16. Hence, the power of the plurality of laser light rays can be controlled effectively without involvement of an increase in the number of components.

The diffracted light 100 and the diffracted light 200 are guided to the photodetector 24 after having been subjected to total reflection at the planes other than the dichroic surface 16a. Therefore, the diffracted light 100 and the diffracted light 200 can enter the photodetector 24 without involvement of a loss in light quantity, which would otherwise be caused by the dichroic surface 16a.

Figure 4:
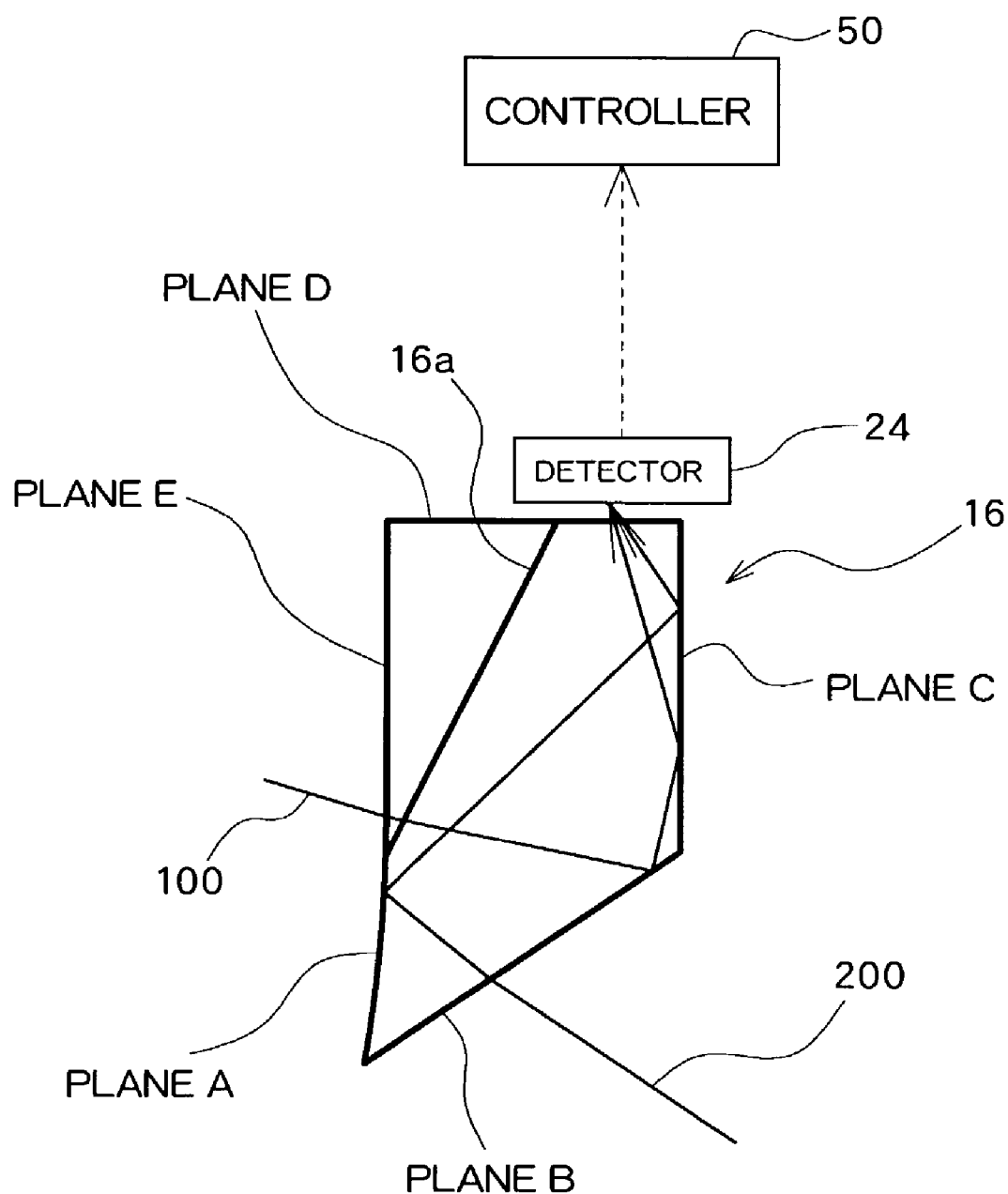
FIG. 4 is a descriptive view of another optical path of the laser light for a DVD within the coupling prism shown in FIG. 1.

FIG. 4 shows another optical path of the diffracted light 100 and another optical path of the diffracted light 200 within the dichroic prism 16. Although the planes A, E are coplanar in FIG. 3, the planes A, E are formed in FIG. 4 such that a predetermined angle is formed therebetween. The diffracted light 100 enters the plane E and is subjected to total reflection at the planes B, C and guided to the photodetector 24. Meanwhile, the diffracted light 200 undergoes total reflection at the plane A and again undergoes total reflection at the plane C, and then enters the photodetector 24. Both the diffracted light rays 100 and 200 exit to the outside from the plane D of the dichroic prism 16 and then enter the photodetector 24. In some cases, restrictions pertaining to the requirements for the layout of the photodetector 24 may pose difficulty in receiving both the diffracted light rays 100, 200. Specifically, there may be a case where some degree of difference arises between the direction and position of incidence of the diffracted light 100 on the plane D and the direction and position of incidence of the diffracted light 200 on the plane D and where the photodetector 24, being of finite size, fails to detect such a difference. In such a case, as shown in FIG. 4, the optical pickup is configured so as to cause the diffracted light 200 to again undergo total reflection at the plane C after having undergone total reflection at the plane A, thereby rendering the condition for incidence of the diffracted light 100 on the plane D analogous to that for incidence of the diffracted light 200 on the same to a certain extent. Consequently, the single photodetector 24 can receive both the diffracted light 100 and the diffracted light 200.

The conditions to be satisfied by the respective planes of the dichroic prism 16 are as follows:
Plane A: causes total reflection of the diffracted light 200,
Plane B: causes total reflection of the diffracted light 100,
Plane C: causes total reflection of the diffracted light 100 and the diffracted light 200, and
Plane D: permits passage of the diffracted light 100 and the diffracted light 200.

The only requirement is to select either the configuration shown in FIG. 3 or that shown in FIG. 4, in accordance with the conditions for designing of the optical pickup.

Figure 5:
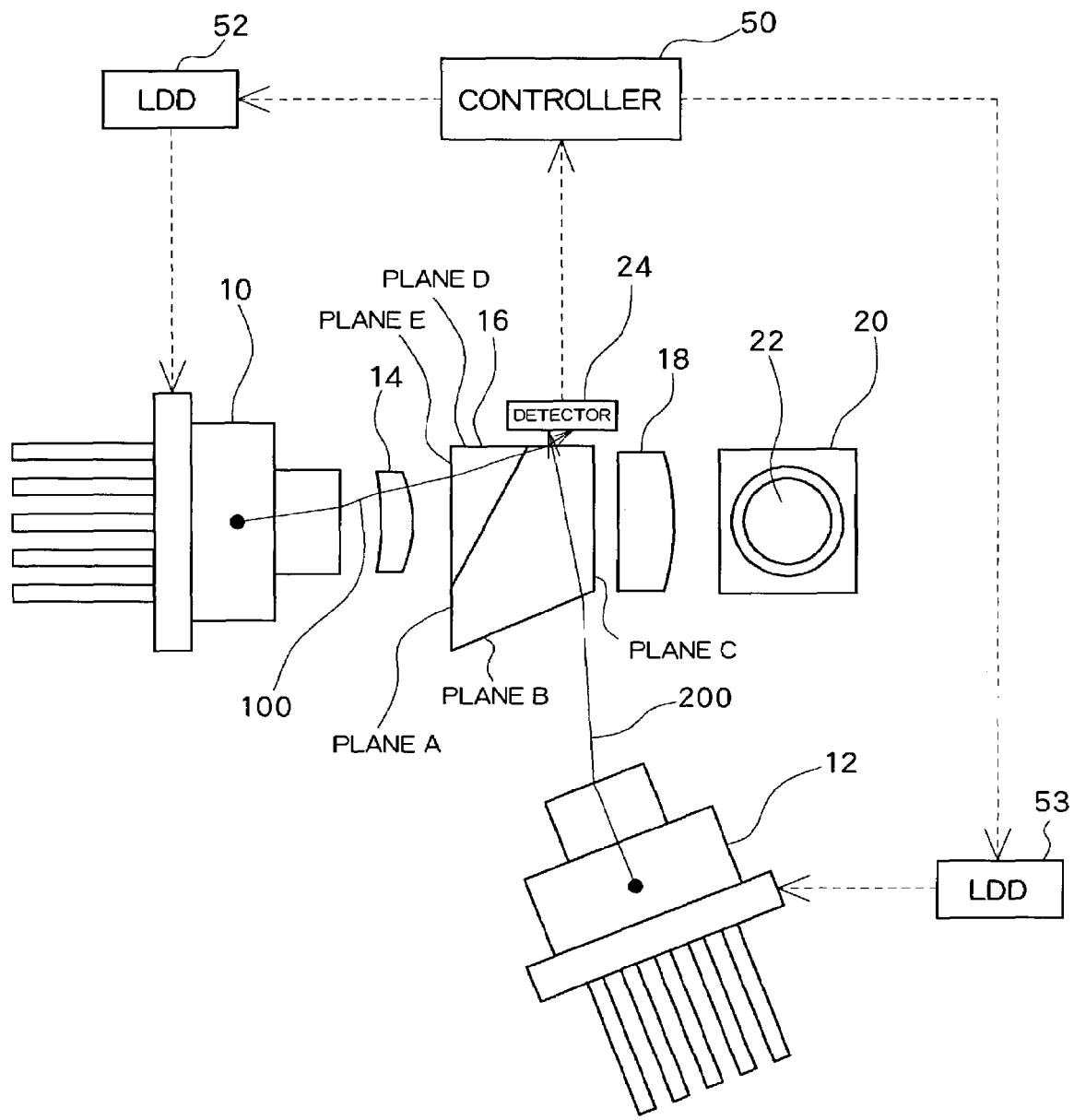
FIG. 5 is a descriptive view of another optical path of the laser light for a CD and another optical path of the laser light for a DVD within the coupling prism shown in FIG. 1.

In FIGS. 3 and 4, the positive first-order diffracted light emanating from the CD LD 10 is used as the diffracted light 100, and the negative first-order diffracted light emanating from the DVD LD 12 is used as the diffracted light 200. However, negative first-order diffracted light emanating from the CD LD 10 may also be employed as the diffracted light 100, and positive first-order diffracted light emanating from the DVD LD 12 may also be employed as the diffracted light 200. Four combinations are possible: that is, (LD diffracted light, DVD diffracted light)=(positive first-order diffracted light, positive first-order diffracted light), (negative first-order diffracted light, positive first-order diffracted light), (positive first-order diffracted light, negative first-order diffracted light), and (negative first-order diffracted light, negative first-order diffracted light);

FIG. 5 shows an example in which the negative first-order diffracted light emanating from the CD LD 10 is taken as the diffracted light 100 and the positive first-order diffracted light emanating from the DVD LD 12 is taken as the diffracted light 200. The diffracted light 100 enters the dichroic prism 16 from the plane E thereof, passes through the plane D, and is guided to the photodetector 24. The diffracted light 200 enters the dichroic prism 16 from the plane B thereof, passes through the plane D, and enters the photodetector 24. In the case of the example shown in FIG. 5, both the diffracted light rays 100 and 200 are guided to the photodetector 24 after having merely passed through the dichroic prism 16 without being subjected to total reflection therein.

Both the positive first-order diffracted light and the negative first-order diffracted light may be used as the diffracted light 100, and both the positive first-order diffracted light and the negative first-order diffracted light may be used as the diffracted light 200. Specifically, as shown in FIG. 5, the negative first-order diffracted light emanating from the CD LD 10 passes through the dichroic prism 16 and is guided to the photodetector 24. For instance, the positive first-order diffracted light emanating from the CD LD 10 is subjected to total reflection within the dichroic mirror 16 as has been described in connection with FIG. 1 and is guided to the photodetector 24. The same also applies to the diffracted light 200. The positive first-order diffracted light emanating from the DVD LD 12 can be caused to pass through the dichroic prism 16 and guided to the photodetector 24. The negative first-order diffracted light can be subjected to total reflection within the dichroic prism 16 and guided to the photodetector 24.

Figure 6:
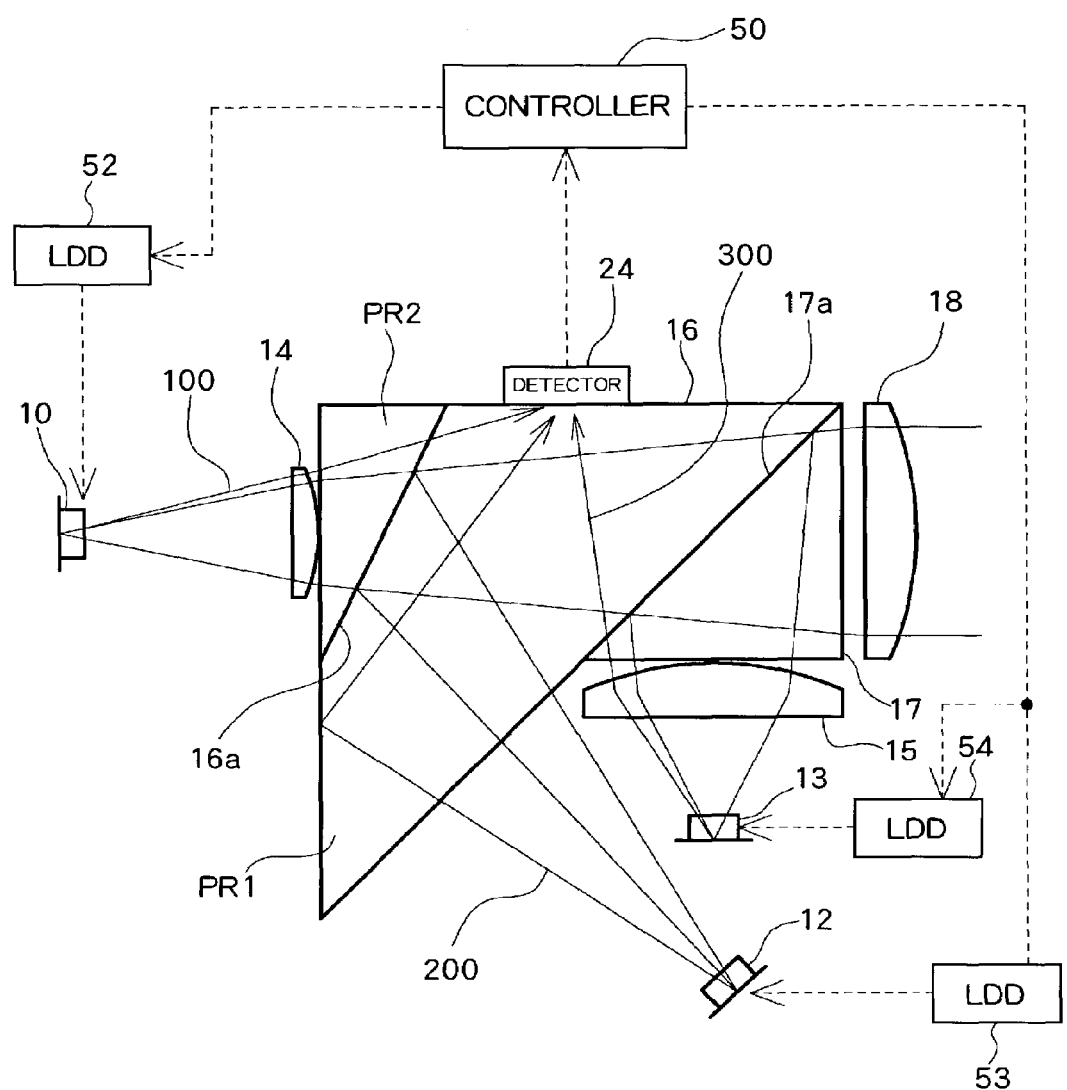
FIG. 6 is another block diagram of an optical pickup to be incorporated into the optical disk apparatus.

FIG. 6 shows the configuration of an optical pickup section obtained when three light sources are employed. In addition to the CD LD 10 and the DVD LD 12, an LD 13 for emitting laser light—which is shorter in wavelength than the laser light rays emanating from the CD LD 10 and the DVD LD 12—is provided as a light source. The LD 13 emits laser light of, e.g., 405 nm, to thereby record/reproduce data on/from a high-density, large-capacity optical disk [e.g., Blu-ray (trademark) disk].

In addition to the dichroic prism 16, another prism 17 is also provided on the optical path as a coupling prism. Both the dichroic prism 16 and the prism 17 assume a triangular geometry when viewed from above. The dichroic prism 16 and the prism 17 are cemented together, whereby a dichroic surface 17a is formed. Here, the dichroic prism 16 is formed by cementing together the prisms PR1, PR2, and a mating surface existing between the prisms PR1, PR2 constitutes the dichroic surface 16a.

The long-wave laser light emanating from the CD LD 10 (i.e., CD laser light) and the short-wave laser light emanating from the DVD LD 12 (i.e., the DVD laser light) are coupled together by the dichroic prism 16. After having passed through the coupling lens 14, the CD laser light passes through the dichroic surface 16a of the dichroic prism 16, thus entering the collimator lens 18. The DVD laser light is subjected to reflection at the dichroic surface 16a, thus entering the collimator lens 18. The optical axis of the CD laser light having passed through the dichroic surface 16a and the optical axis of the DVD laser light reflected from the dichroic surface 16a are aligned with each other.

The CD laser light and the DVD laser light, having been coupled together, enter the dichroic prism 17 and pass through a dichroic surface 17a. Very-short-frequency laser light which has entered the dichroic prism 17 and emanated from the LD 13 is subjected to reflection at the dichroic surface 17a, thus entering the collimator lens 18. The optical axis of the very-short-frequency laser light that has undergone reflection at the dichroic surface 17a is aligned with the optical axis of the CD laser light and that of the DVD laser light.

In the configuration in which the light rays emanating from the three light sources are coupled together through use of the two dichroic prisms 16, 17, the photodetector 24 is disposed in close proximity to the dichroic prism 16. The diffracted light rays emanating from the LDs 10, 12, and 13 are guided to the photodetector 24 through use of the dichroic prisms 16, 17. More specifically, the diffracted light 100 emanating from the CD LD 10 passes through the dichroic prism 16 and enters the photodetector 24. The diffracted light 200 emanating from the DVD LD 12 undergoes total reflection and enters the photodetector 24. Further, diffracted light 300 emanating from the LD 13 passes through the dichroic prism 17 and further passes through the dichroic prism 16, thus entering the photodetector 24. Even when the light rays emanating from the three light sources are coupled together, the power of the three laser light rays can be detected and adjusted through use of a single photodetector 24.

When data are recorded on a CD, the CD LD 10 is driven. The diffracted light 100 emanating from the CD LD 10 is detected by the photodetector 24, and an electric signal corresponding to the quantity and intensity of received light is supplied to the controller 50. The controller 50 computes power of the main beam of the CD laser light from a power ratio of the main beam to the diffracted light 100, the ratio being stored in the memory beforehand, thereby controlling the LDD 52 such that desired recording power is attained. The LDD 52 increases or decreases a drive current for the CD LD 10 in accordance with the control signal output from the controller 50, thereby acquiring desired recording power through feedback control. When data are recorded on a DVD, the DVD LD 12 is driven. The diffracted light 200 emanating from the DVD LD 12 is detected by the photodetector 24. An electric signal corresponding to the intensity of received light is supplied to the controller 50. The controller 50 computes the power of the main beam of the DVD laser light from the power ratio of the main beam to the diffracted light 200, the ratio being stored in the memory beforehand, thereby controlling the LDD 53 so as to acquire desired recording power. In accordance with the control signal output from the controller 50, the LDD 53 increases or decreases the drive current for the DVD LD 12, thereby acquiring desired recording power through feedback control. When data are recorded on a Blu-ray (Trademark) disk, the LD 13 is driven. The diffracted light 300 emanating from the LD 13 is detected by the photodetector 24. An electric signal corresponding to the intensity of received light is supplied to the controller 50. The controller 50 computes the power of the main beam of laser light for Blu-ray from the power ratio of the main beam to the diffracted light 300, the ratio being stored in the memory beforehand, thereby controlling an LDD 54 so as to acquire desired recording power. In accordance with the control signal output from the controller 50, the LDD 54 increases or decreases the drive current for the LD 13, thereby acquiring desired recording power through feedback control. Of the three LDDs; that is, the LDD 52, the LDD 53, and the LDD 54, two arbitrary LDDs or all three LDDs may be embodied by a single common LDD.

The layout of the three light sources and the photodetector 24 is preferably determined so as to prevent the diffracted light rays 100, 200, and 300 from passing through the dichroic surfaces 16a, 17a, which would otherwise cause a loss in the quantity of the respective diffracted light rays.

When the diffracted light ray passes through the dichroic surface, the power ratio of the main beam to the diffracted light obtained at that time is stored. When the diffracted light does not pass through any dichroic surface, the power ratio of the main beam to the diffracted light obtained at that time is stored in the memory. The power ratios are measured and stored in the memory in advance. When the diffracted light passes through any dichroic surface, the diffracted light is slightly reflected by the dichroic surface, and hence the power of the diffracted light to be detected by the photodetector 24 decreases.

As shown in FIG. 6, when the diffracted light emanating from the LD 13 is caused to pass through the dichroic surface 17a and guided to the photodetector 24, a dichroic film is formed within an effective diameter of the objective lens of the dichroic surface 17a so as to permit passage of laser light rays of 650 nm and 780 nm. Outside the effective diameter of the objective lens, the dichroic film is formed on the dichroic surface so as to permit passage of laser light of 405 nm.

All the diffracted light rays emanating from the three light sources shown in FIG. 6 are guided to the single photodetector 24. However, the configuration shown in FIG. 6 enables guiding of at least one of the three diffracted light rays 100, 200, and 300 to the photodetector 24 through use of the dichroic prism 16 or 17. For instance, by means of the configuration shown in FIG. 6, the diffracted light 100 and the diffracted light 200 are guided to the photodetector 24. The diffracted light rays 100 and 300 or the diffracted light rays 200 and 300 can be guided to the photodetector 24. When a plurality of light sources are present, diffracted light stemming from a plurality of laser light rays emanating from the light sources is guided to a common photodetector through use of a coupling prism to be used for coupling together the plurality of laser light rays.

When the diffracted light 100 and the diffracted light 200 are guided to the photodetector 24, the diffracted light 300 is guided to another photodetector, where the power of the diffracted light 300 is detected. The other photodetector may be disposed at a position in close proximity to the dichroic prism 16 and adjacent to the photodetector 24.

The above descriptions have explained the configuration for detecting the power of a main beam through use of diffracted light from an LD; that is, another beam of the laser light emanating from the LD other than the main beam. Next will be described a configuration for detecting the power of the main beam through use of the main beam rather than through use of the diffracted light emanating from the LD. A basic technical concept is based on the fact that not all the main beam emanating from the CD LD 10 passes through the dichroic surface 16a and some of the main beam is reflected by the dichroic surface 16a. The laser light reflected from the dichroic surface 16a is "useless" laser light which does not enter the objective lens 22, nor is it radiated onto an optical disk. A power control method to be described below utilizes such useless laser light.

Figure 7:
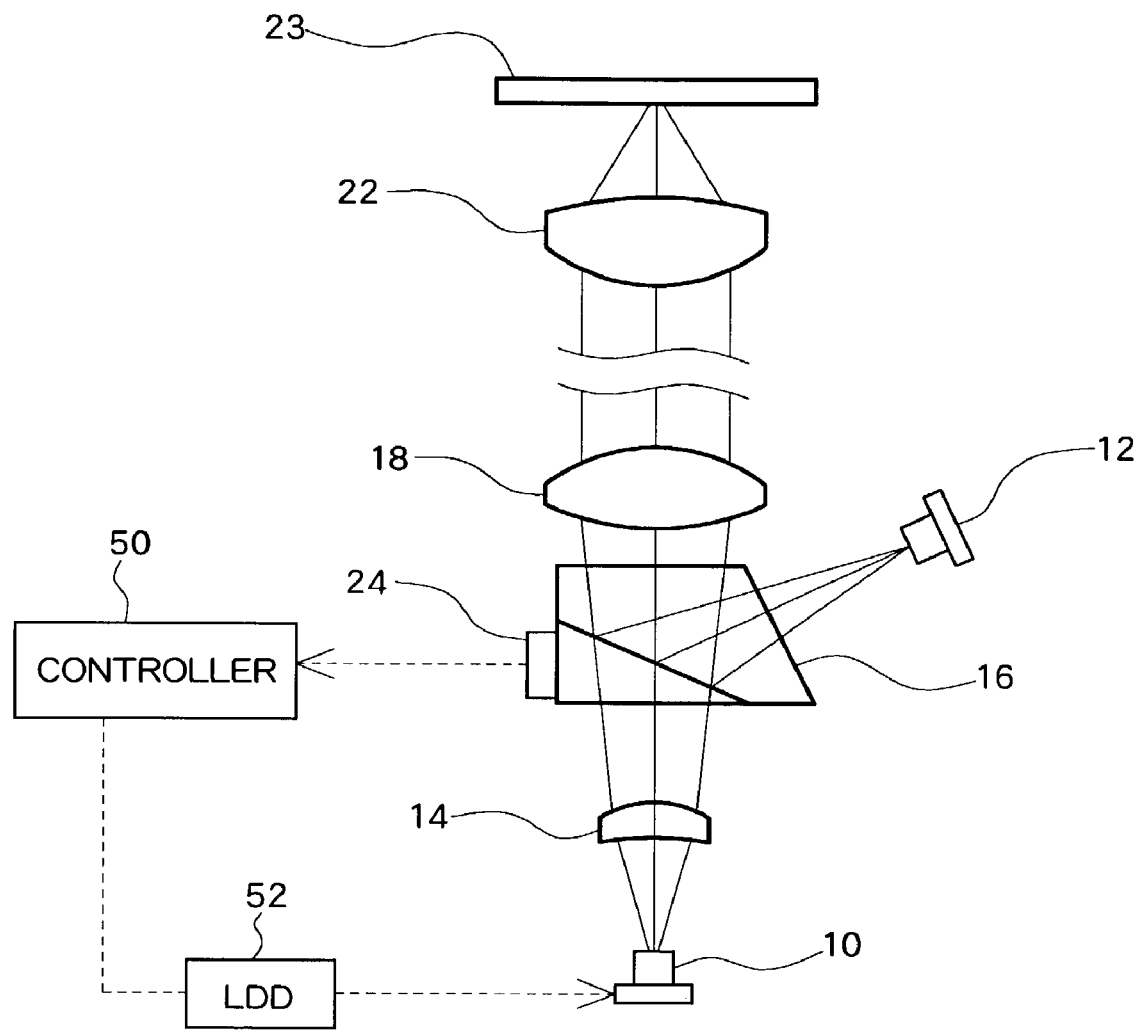
FIG. 7 is still another block diagram of an optical pickup to be incorporated into the optical disk apparatus.

FIG. 7 shows the configuration of an optical pickup section of the optical disk apparatus.

The CD LD 10 serving as the light source emits CD laser light of 780 nm, and the DVD LD 12 serving as the light source emits DVD laser light of 650 nm. The CD laser light passes through the coupling lens 14 and enters the dichroic prism 16. The DVD laser light also enters the dichroic prism 16. The CD laser light passes through the dichroic surface 16a of the dichroic prism 16, thus entering the collimator lens 18. The DVD laser light is reflected by the dichroic surface 16a, thus entering the collimator lens 18. The CD laser light and the DVD laser light, having been coupled together by the dichroic prism 16, enter and are converted by the objective lens 22, and the thus-converted laser light is radiated onto an optical disk 23.

The photodetector 24 for receiving the CD laser light is disposed in close proximity to a specific surface of the dichroic prism 16. The photodetector 24 may be in contact with or spaced away from the surface of the dichroic prism 16. The CD laser light passes through the dichroic surface 16a, but not all the CD laser light passes through the dichroic surface. Some of the CD laser light (several percent) do not pass through and are reflected by the dichroic surface 16a. In the embodiment, the power of the CD laser light is detected by active utilization of the reflected laser light. Specifically, the CD laser light reflected by the dichroic surface 16a further undergoes total reflection at the dichroic surface 16 and is guided to the photodetector 24 disposed adjacent to the specific surface. The photodetector 24 converts the received CD laser light into an electric signal. The thus-converted electric signal is supplied to the controller 50 and further to the LDD 52, whereby the power of the laser light is subjected to feedback control. The proportion of the laser light reflected from the dichroic surface 16a is known. The power of the laser light of the main beam entering the objective lens 22 can be computed from the power of the laser light received by the photodetector 24.

Figure 8:
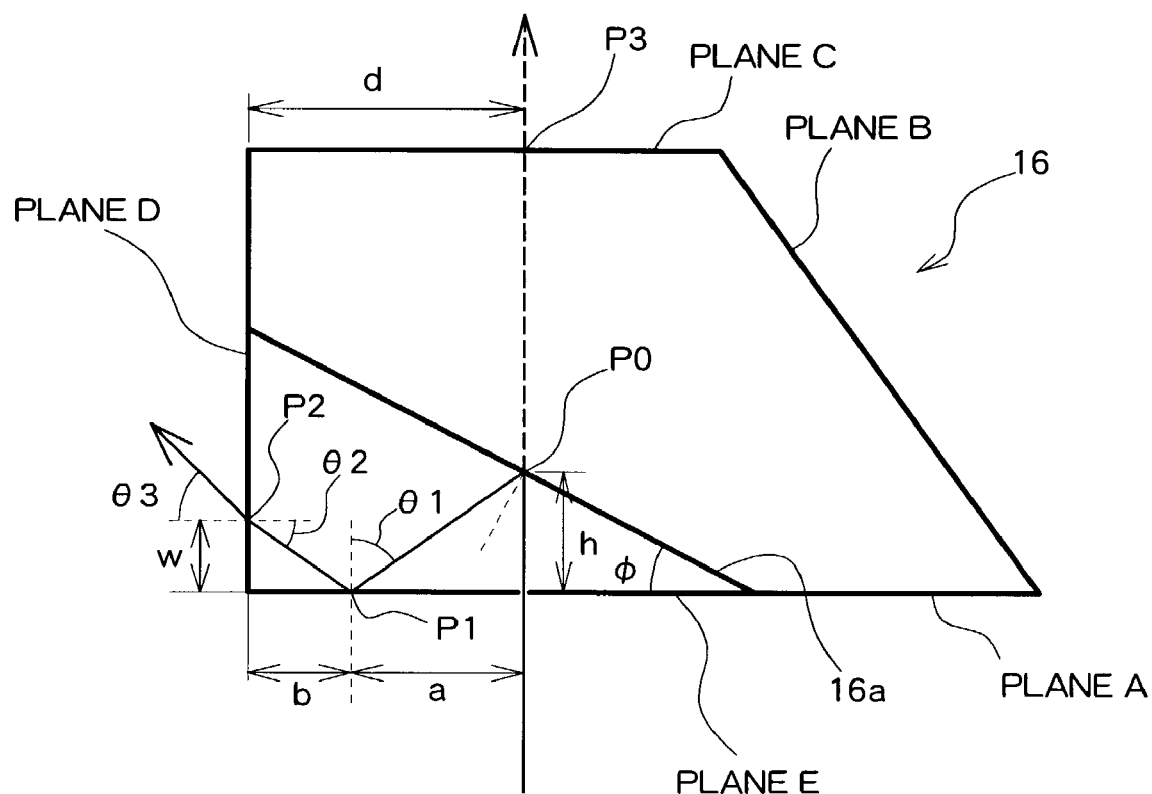
FIG. 8 is a descriptive view of an optical path of the laser light for a CD within the coupling prism shown in FIG. 7.

FIG. 8 shows an optical path of the laser light for a CD within the dichroic prism 16. The CD laser light enters the dichroic surface 16a from the plane E thereof and falls on a position P0 on the dichroic surface 16a. The majority of the CD laser light passes through the dichroic surface 16a and exits from the dichroic prism 16 by way of the position P3 on the plane C, thus entering the collimator lens 18.

The CD laser light which has failed to pass through the dichroic surface 16a and has been reflected from the same again reaches the plane E. The CD laser light then falls on the position P1 on the plane E at an incident angle of θ1. When θ1 satisfies requirements for total reflection; that is, when θ1 assumes $\sin^{-1}(n2/n1)$ (where n1 denotes the refractive index of the dichroic prism 16 and n2 denotes the refractive index of air) or higher, the CD laser light undergoes total reflection at the plane B. When the dichroic prism 16 is formed from BK7 glass (having a refractive index of n1=1.51), the CD laser light is totally reflected at an incident angle of 41.5° or more. The laser light that has undergoing total reflection at the position P1 enters the plane D of the dichroic prism 16 at an incident angle of θ2, and passes through the plane D, thus reaching the photodetector 24. The laser light passes through the plane D without involvement of total reflection under the condition that θ2 assumes a value of less than 41.5° when the photodetector 24 is spaced away from the plane D. When the photodetector 24 remains in contact with the plane D, the refractive index of a resin section of the photodetector 24 assumes a value of 1.55 or thereabouts. Thus, the resin section is higher in refractive index than BK7 of the dichroic prism 16. Consequently, the laser light enters the photodetector 24 without undergoing total reflection at the plane D at all times.

As shown in FIG. 8, the following equations stand under the condition that an angle formed between the dichroic surface 16a of the dichroic prism 16 and the plane E or A is taken as "φ"; that a distance between the position when the CD laser light first enters the plane E and the position P0 on the dichroic surface 16a where the CD laser light enters is taken as "h"; a distance between a location by way of which the CD laser light first enters the plane E and the position P1 where the CD laser light re-enters the plane E after having undergone reflection at the dichroic surface 16a is taken as "a"; a distance between the position P1 and the plane D is taken as "b"; a distance between the position P2 where the CD laser light having undergone total reflection at the plane E enters the plane D and the plane E is taken as "w"; and a distance between the position P3 by way of which the CD laser light having passed through the dichroic surface 16a exits from the dichroic prism 16 and the plane D is taken as "d."

Incident angle $\theta 1$ of the plane $E = 2 \cdot \phi$;

Incident angle $\theta 2$ of the plane $D = 90° - 2 \cdot \phi$;

Refracting angle $\theta 3$ of the plane $D = \sin^{-1}(n \cdot \cos(2 \cdot \phi))$;

$$a = h \cdot \tan(2 \cdot \phi); \quad (6)$$
$$b = d - h \cdot \tan(2 \cdot \phi);$$
$$w = d / \tan(2 \cdot \phi) - h$$

By means of these equations, the angle $\phi$ required for the laser light to undergo total reflection at the plane E at the incident angle $\theta 1$ and to pass through the plane D at the incident angle $\theta 2$ is determined. Moreover, a position "w" at which the photodetector 24 is to be placed is also determined.

The reflectivity of the plane E and the transmissivity of the plane D are computed as follows according to Fresnel's formula.

Reflectivity R of the plane $E = \tan^2(\theta_1 i - \theta_1 t)/\tan^2(\theta_1 i + \theta_1 t)$ (7)

Transmissivity T of the plane $D = \sin(2 \cdot \theta_2 i) \sin(2 \cdot \theta_2 t)/\{\sin^2(\theta_2 i + \theta_2 t) \sin^2(\theta_2 i - \theta_2 t)\}$ (8)

In the above equations, $\theta_j i$ and $\theta_j t$ (j=1, 2) denote an incident angle and an exit angle at point $P_j$. When the dichroic prism 16 is formed from BK7 glass, the power of laser light emanating from the plane D is plotted as shown in FIG. 9, provided that the CD laser light reflected from the dichroic surface 16a is taken as 100(%).

Figure 9:
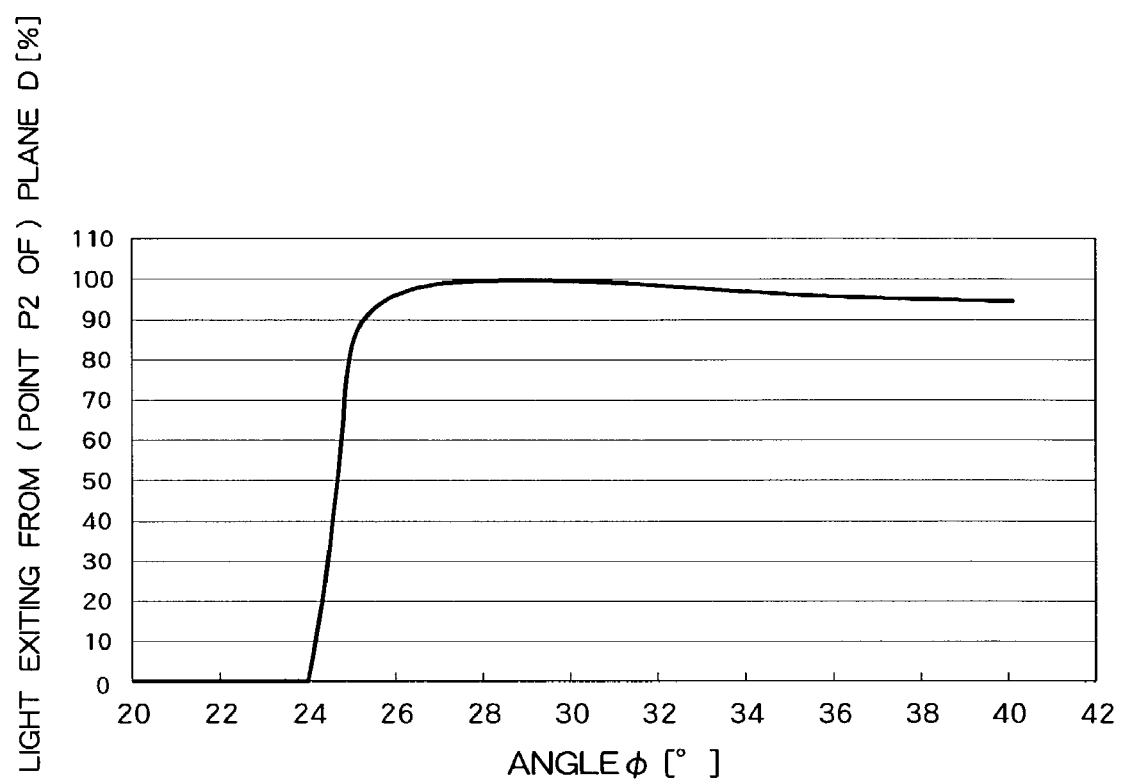
FIG. 9 is a graph showing a relationship between an angle of a coupling surface and power of outgoing light.

In FIG. 9, the horizontal axis of the graph represents the angle $\phi$ of the dichroic surface 16a and the vertical axis of the graph represents the power of the laser light exiting from the plane D, expressed as a proportion. As can be seen from the graph, when the angle $\phi$ ranges from 26° to 40°, 96% or more of the CD laser light reflected from the dichroic surface 16a exits from the plane D and is received by the photodetector 24. Therefore, most of the CD laser light reflected from the dichroic surface 16a can be guided to the photodetector 24 by setting the angle $\phi$ of the dichroic surface 16a within an appropriate range, thereby detecting the power of the CD laser light.

The power of the DVD laser light emanating from the DVD LD 12 can also be detected by the photodetector 24. Specifically, the DVD laser light is substantially reflected by the dichroic surface 16a. However, some of the DVD laser light passes through the dichroic surface 16a and reaches the plane E of the dichroic prism 16. The DVD laser light that has reached the plane E is subjected to total reflection at the plane E, caused to pass through the plane D, and guided to the photodetector 24, thereby detecting power of the CD laser light and that of the DVD laser light through use of the single photodetector 24.

Figure 10:
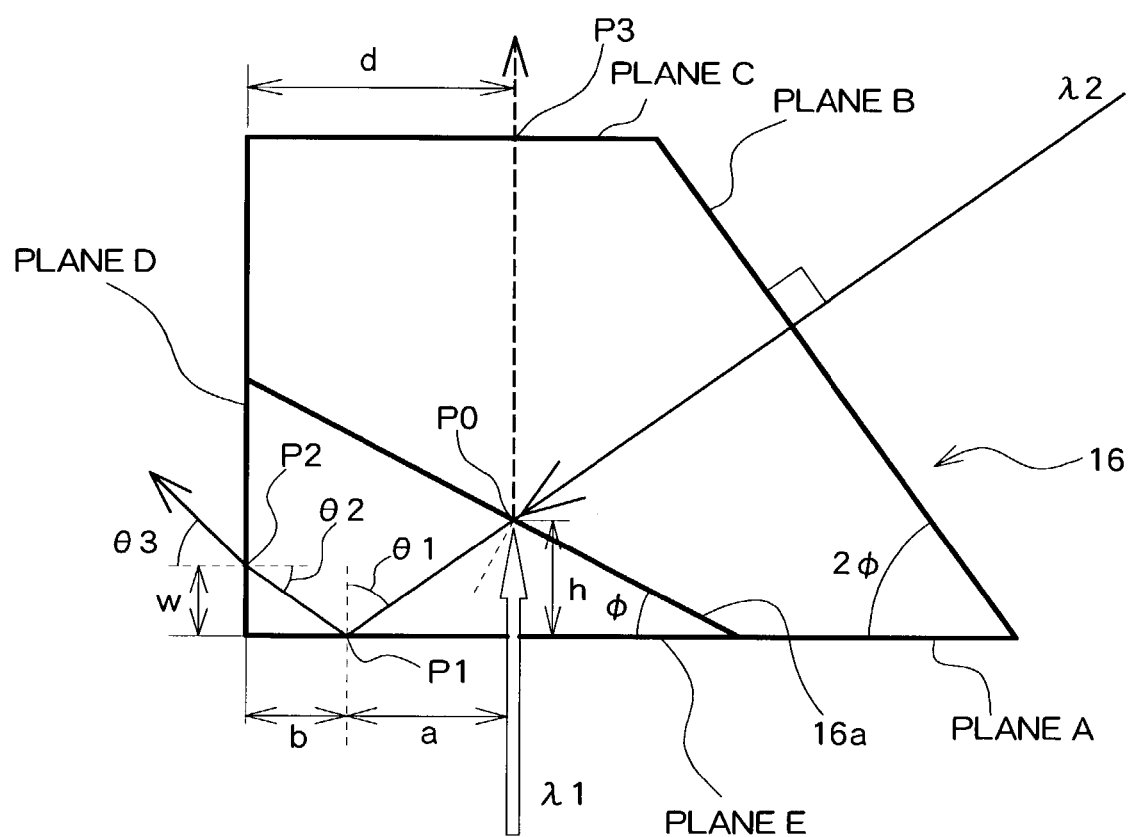
FIG. 10 is a descriptive view of an optical path of laser light for a DVD within the coupling prism shown in FIG. 7.

FIG. 10 shows an optical path of the DVD laser light within the dichroic prism 16. The DVD laser light (having a wavelength $\lambda 2 = 650$ nm) enters the dichroic prism 16 and reaches the dichroic surface 16a. Most of the DVD laser light is reflected from the dichroic surface 16a. Some of the DVD laser light (several percent) passes through the dichroic surface 16a and reaches the plane E. When the incident angle $\theta$ of the DVD laser light at the plane E is $\sin^{-1}(n2/n1)$ or more, the DVD laser light undergoes total reflection at the plane E. When the dichroic prism 16 is formed from BK7 glass, the DVD laser light reaches the plane D after having undergone total reflection at the plane E, provided that the incident angle $\theta 1$ assumes a value of 41.5° or more. The DVD laser light that has entered the plane D at the incident angle $\theta 2$ passes through the plane D under the condition that the incident angle $\theta 2$ assumes a value less than 41.5°. The photodetector 24 can detect the DVD laser light by satisfying such a condition. The only requirement is to adjust the layout of the DVD LD 12 such that the angles $\theta 1$ and $\theta 2$ satisfy the foregoing conditions.

The DVD laser light that has passed through the dichroic surface 16a enters the photodetector 24 along the same optical path as that of the CD laser light reflected from the dichroic surface 16a (since the refractive index of the dichroic prism 16 slightly changes according to a wavelength, the two optical paths do not strictly coincide with each other by only the amount corresponding to the change). Accordingly, the single photodetector 24 disposed at a single position can detect the power of the CD laser light and that of the DVD laser light. The CD LD 10 and the DVD LD 12 are selectively driven. When the CD LD 10 is driven, the photodetector 24 detects the power of the CD laser light. When the DVD LD 12 is driven, the photodetector 24 detects the power of the DVD laser light.

Figure 11:
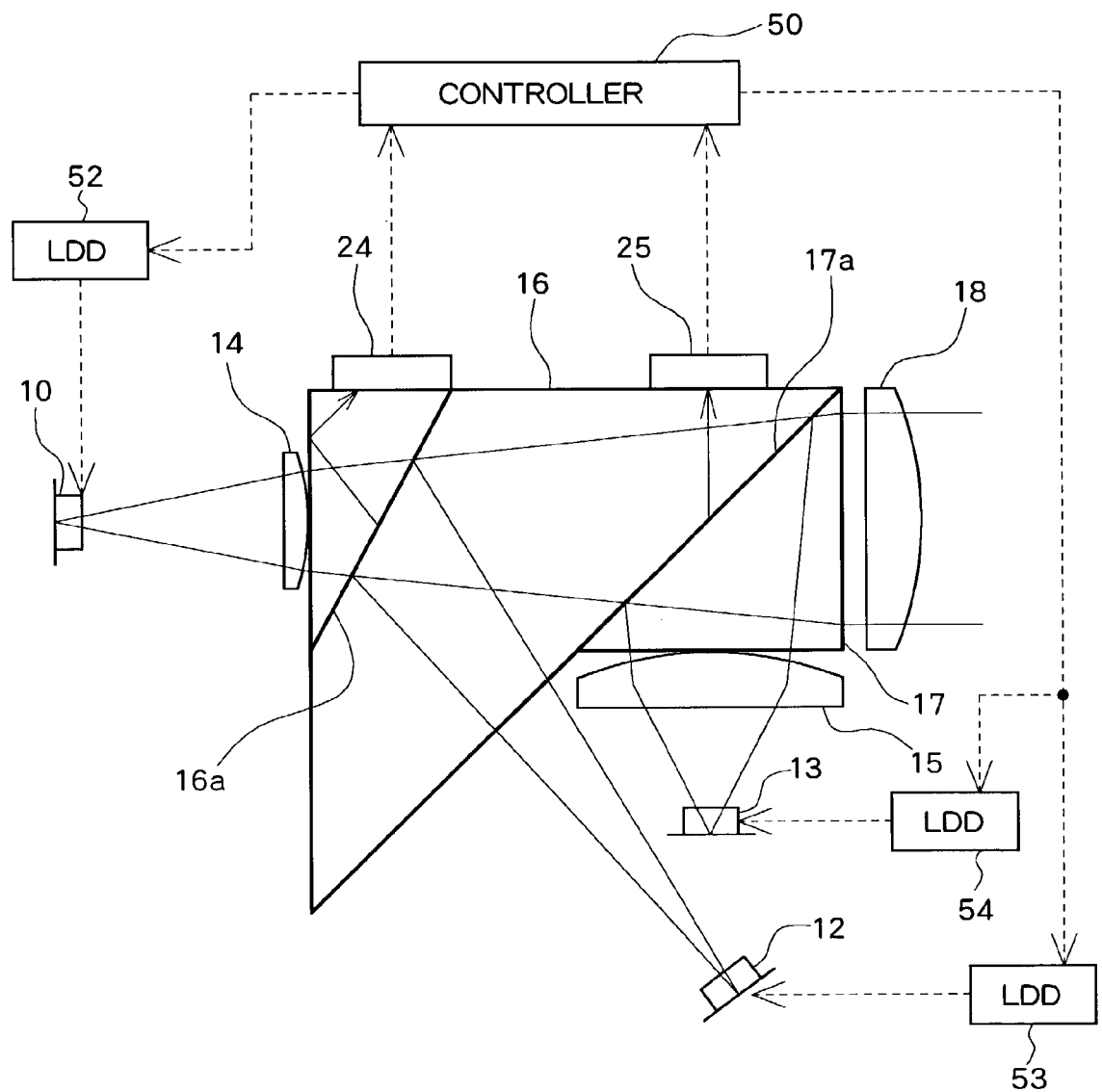
FIG. 11 is another block diagram of another optical pickup to be incorporated into the optical disk apparatus.

FIG. 11 shows the configuration of the optical pickup section where three light sources are disposed. In addition to the CD LD 10 and the DVD LD 12, the LD 13, which emits laser light of shorter wavelength (e.g., 405 nm), is provided in the optical pickup section. In addition to the dichroic prism 16, the prism 17 is also provided as a coupling prism. The two prisms 16, 17 are cemented together, thereby defining the dichroic surface 17a. The CD laser light emanating from the CD LD 10 passes through the coupling lens 14, thus entering the dichroic lens 16. Further, the DVD laser light emanating from the DVD LD 12 also enters the dichroic prism 16. The CD laser light passes through the dichroic surface 16a, thus entering the dichroic prism 17. The DVD laser light enters the dichroic prism 17 after having been reflected by the dichroic surface 16a. The CD laser light and the DVD laser light pass through the dichroic surface 17a, thus entering the collimator lens 18.

The very-short-frequency laser light emanating from the LD 13 passes through the coupling lens 15, thus entering the dichroic prism 17. The very-short-frequency laser light is reflected by the dichroic surface 17a, and the optical axis of the very-short-frequency laser light is aligned with that of the CD laser light and that of the DVD laser light, thus entering the collimator lens 18. In this way, even when the three laser light rays exit from the three light sources LD 10, LD 12, and LD 13, the three laser light rays can be coupled together and guided to the common objective lens 22 through use of the two coupling prisms 16, 17.

Photodetectors 24, 25 are disposed in close proximity to a specific surface of the dichroic prism 16. The photodetectors 24, 25 may be in contact with or spaced away from the surface of the dichroic prism 16. Although the CD laser light substantially passes through the dichroic surface 16a, some of the CD laser light is reflected by the dichroic surface 16a. The CD laser light is subjected to total reflection within the planes of the dichroic prism 16, and the resultant light is received by the photodetector 24. Most of the DVD laser light is substantially reflected from the dichroic surface 16a. However, some of the DVD laser light passes through the dichroic surface 16a. As in the case of the CD laser light, the DVD laser light is subjected to total reflection within the planes of the dichroic prism 16, and the resultant light is received by the photodetector 24. Consequently, the photodetector 24 can detect the power of the CD laser light and that of the DVD laser light. Further, the majority of the very-short-frequency laser light emanating from the LD 13 is reflected by the dichroic surface 17a. However, some of the very-short-frequency laser light passes through the dichroic surface 17a. The very-short-frequency laser light is received by the photodetector 25 disposed in close proximity to the specific surface of the dichroic prism 16. The location where the photodetector 25 is to be placed is controlled in accordance with the position of the LD 13. Accordingly, the photodetector 25 detects the power of the very-short-frequency laser beam, and the resultantly-obtained electric signal is supplied to the controller 50 and further to the LDD 54, thereby enabling control of power of the very-short-frequency laser light.

When data are recorded on a CD, the CD LD 10 is driven. Of the main beam emanating from the CD LD 10, the laser light reflected from the dichroic surface 16a is detected by the photodetector 24, and an electric signal corresponding to the quantity and intensity of received light is supplied to the controller 50. The controller 50 computes power of the transmitted main beam of the CD laser light through use of a power ratio of a reflected main beam to a transmitted main beam, the ratio being stored in the memory beforehand, thereby controlling the LDD 52 such that desired recording power is attained. The LDD 52 increases or decreases a drive current for the CD LD 10 in accordance with the control signal output from the controller 50, thereby acquiring desired recording power through feedback control. When data are recorded on a DVD, the DVD LD 12 is driven. Of the main beam emanating from the DVD LD 12, the laser light that has passed through the dichroic surface 16a is detected by the photodetector 24, and an electric signal corresponding to the intensity of received light is supplied to the controller 50. The controller 50 computes the power of a reflected main beam of the DVD laser light through use of the power ratio of the transmitted main beam to the reflected main beam, the ratio being stored in the memory beforehand, thereby controlling the LDD 53 so as to acquire desired recording power. In accordance with the control signal output from the controller 50, the LDD 53 increases or decreases the drive current for the DVD LD 12, thereby acquiring desired recording power through feedback control. When data are recorded on a very-short-frequency optical disk, such as the Blu-ray (Trademark) disk, the LD 13 is driven. Of the main beam emanating from the LD 13, the laser light that has passed through the dichroic surface 17a is detected by the photodetector 25, and an electric signal corresponding to the quantity and intensity of received light is supplied to the controller 50. The controller 50 computes the power of the reflected main beam from the power ratio of the transmitted main beam to the reflected main beam, the ratio being stored in the memory beforehand, thereby controlling the LDD 54 so as to acquire desired recording power. In accordance with the control signal output from the controller 50, the LDD 54 increases or decreases the drive current for the LD 13, thereby acquiring desired recording power through feedback control. Of the three LDDs; that is, the LDD 52, the LDD 53, and the LDD 54, two arbitrary LDDs or all the three LDDs may be embodied by a single, common LDD.

The power of all the three laser light rays emanating from the three light sources shown in FIG. 11 is detected by the two photodetectors 24, 25. For instance, the photodetector 24 detects the power of only CD laser light or the power of only the DVD laser light. Alternatively, only the photodetector 25 may detect the power of the very-short-frequency laser light. In FIG. 11, only the photodetector 25 is disposed in close proximity to the dichroic prism 16, thereby detecting the power of only the very-short-frequency laser light. Moreover, the outer shape of the dichroic prism 16 may be considered to be controlled so as to cause the very-short-wavelength laser light having passed through the dichroic surface 17a to undergo total reflection within the planes of the dichroic prism 16, whereby the laser light is guided to the photodetector 24. In this case, the single photodetector 24 can detect the power of the three laser light rays.

The embodiments have described a case where the CD laser light passes through the dichroic surface (dichroic film) 16a of the dichroic prism 16 and the DVD laser light is reflected by the dichroic surface. However, a person skilled in the art can readily comprehend that the two laser light rays can be coupled together by causing the dichroic surface 16a of the dichroic prism 16 to reflect the CD laser light and to permit passage of the DVD laser light. Optical characteristics of the dichroic surface 16a are determined in accordance with the optical constant of the dichroic film formed on the mating surface between the two prisms PR1, PR2. The dichroic film can be arbitrarily designed so as to permit passage of the CD laser light and reflect the DVD laser light or to permit passage of the DVD laser light and reflect the CD laser light, by adjusting the material and thickness of the dichroic film. When the dichroic film is designed to reflect the CD laser light and permit passage of the DVD laser light, the dichroic prism 16 guides, from among the CD laser light, the laser light which has not been reflected from and passed through the dichroic surface 16a to the photodetector 24. Alternatively, of the DVD laser light, the laser light which has not been reflected from and has passed through the dichroic surface 16a is guided to the photodetector, thereby enabling detection of the power of the laser light.

What is claimed is:
1. An optical disk apparatus comprising:
a plurality of light sources for emitting light rays of different wavelengths;
coupling means having a coupling surface for transmitting one light ray from at least two light sources from among light rays emanating from said plurality of light sources and reflecting the other of the light rays;
light collecting means for collecting light emanating from said coupling means and guiding the collected light to an optical disk;
light receiving means disposed in the vicinity of said coupling means; and
adjustment means for adjusting the power of at least one of said plurality of light sources in accordance with the intensity of light received by said light receiving means, wherein
said coupling means guides, to said light receiving means, diffracted light which emanates from at least one of two light sources whose light rays are to be coupled together and which has not reached said light collecting means on an optical path by means of reflection or transmission at least within a prism at a surface other than the coupling surface.

2. The optical disk apparatus according to claim 1, wherein said coupling means guides, to said light receiving means, positive first-order diffracted light and/or negative first-order diffracted light which emanates from at least one of two light sources whose light rays are to be coupled together.

3. The optical disk apparatus according to claim 1, wherein said coupling means causes diffracted light emanating from at least one of two light sources whose light rays are to be coupled together to undergo total reflection and guides said diffracted light to said light receiving means.

4. The optical disk apparatus according to claim 1, wherein said plurality of light sources include a light source for a CD and a light source for a DVD; and said coupling means couples together laser light for a CD emanating from said CD light source and laser light for a DVD emanating from said DVD light source, to thereby guide, to said light receiving means, diffracted light emanating from said CD light source and/or diffracted light emanating from said DVD light source.

5. The optical disk apparatus according to claim 1, wherein said plurality of light sources include a long-wave light source and a short-wave light source; and the coupling means couples together long-wave laser light emanating from the long-wave light source and short-wave laser light emanating from the short-wave light source and guides diffracted light emanating from the long-wave light source and/or diffracted light emanating from the short-wave light source.

6. The optical disk apparatus according to claim 1, wherein said plurality of light sources include a first light source for emitting laser light of wavelength $\lambda 1$, a second light source for emitting laser light of wavelength $\lambda 2$, and a third light source for emitting laser light of wavelength $\lambda 3$ ($\lambda 1 > \lambda 2 > \lambda 3$);
said coupling means is formed from first and second coupling means;
said first coupling means couples together said laser light of wavelength $\lambda 1$ emanating from said first light source and said laser light of wavelength $\lambda 2$ emanating from said second light source and guides, to said light receiving means, diffracted light emanating from said first light source and/or diffracted light emanating from said second light source; and
said second coupling means couples together said laser light of wavelength $\lambda 1$ or $\lambda 2$ and said laser light of wavelength $\lambda 3$ emanating from said third light source and guides, to said light receiving means, diffracted light emanating from said third light source.

7. The optical disk apparatus according to claim 1, wherein said plurality of light sources include a first light source for emitting laser light of wavelength $\lambda 1$, a second light source for emitting laser light of wavelength $\lambda 2$, and a third light source for emitting laser light of wavelength $\lambda 3$ ($\lambda 1 > \lambda 2 > \lambda 3$);
said light receiving means includes first light receiving means and second light receiving means;
said coupling means is formed from first and second coupling means;
said first coupling means couples together said laser light of wavelength $\lambda 1$ emanating from said first light source and said laser light of wavelength $\lambda 2$ emanating from said second light source and guides, to said first light receiving means, diffracted light emanating from said first light source and/or diffracted light emanating from said second light source; and
said second coupling means couples together said laser light of wavelength $\lambda 1$ or $\lambda 2$ and said laser light of wavelength $\lambda 3$ emanating from said third light source and guides, to said second light receiving means, diffracted light emanating from said third light source.

8. An optical disk apparatus comprising:
a plurality of laser diodes for emitting light rays of different wavelengths;
at least one laser diode driver for driving said plurality of laser diodes;
a coupling prism having a coupling surface for coupling together at least two laser light rays from among laser light rays emanating from said plurality of laser diodes;
an objective lens which collects light emanating from said coupling prism and guides the light to an optical disk;
a photodetector placed so as to remain in contact with or be spaced only a given distance from one surface of said coupling prism; and
a controller which outputs a control signal to said laser diode driver in accordance with the intensity of laser light received by said photodetector, thereby controlling power of said laser light to a desired value, wherein
said coupling prism causes laser light, which enters at least one plane constituting the coupling prism and which has not reached said objective lens on an optical path, to undergo total reflection at any of the planes constituting said coupling prism other than the coupling surface and guides diffracted light to said photodetector through a route such that the light does not enter the coupling surface.

9. The optical disk apparatus according to claim 8, wherein said coupling prism is formed by cementing together a first prism and a second prism via a mating surface; a dichroic film which permits passage of one of two laser light rays to be coupled together and reflects the other laser light ray is formed on said mating surface; and said coupling prism guides at least any one of diffracted light emanating from said laser diodes which have emitted two laser light rays to be coupled together to said photodetector.

10. The optical disk apparatus according to claim 8, wherein said coupling prism is formed by cementing together a first prism and a second prism via a mating surface; a dichroic film which permits passage of one of two laser light rays to be coupled together and reflects the other laser light ray is formed on said mating surface; and said coupling prism guides laser light of said one laser light reflected from said coupling surface and/or laser light of said other laser light having passed through said coupling surface to said photodetector.

11. An optical disk apparatus comprising:
a plurality of light sources for emitting light rays of different wavelengths; coupling means having at least one coupling surface for transmitting one of at least two light rays from among light rays emanating from said plurality of light sources and reflecting the other of the two light rays;
light collecting means for collecting light emanating from said coupling means and guiding the collected light to an optical disk;
light receiving means disposed in the vicinity of said coupling means; and
adjustment means for adjusting the power of at least one of said plurality of light sources in accordance with the intensity of light received by said light receiving means, wherein said coupling means subjects to total reflection on a surface of the coupling means other than the coupling surface, at least one of a portion of the one light ray which is to be reflected by the coupling surface of and a portion of the other light ray which is to transmit through the coupling surface, and guides a diffracted light ray subjected to total reflection to the light receiving means.

12. The optical disk apparatus according to claim 11, wherein said plurality of light sources include a light source for a CD and a light source for a DVD;

said coupling means has a coupling surface which permits passage of laser light for a CD emanating from said CD light source and reflects laser light for a DVD emanating from said DVD light source, to thereby perform coupling operation, and said coupling means guides, to said light receiving means, laser light of the CD laser light reflected from said coupling surface and/or laser light of the DVD laser light having passed through said coupling surface.

13. The optical disk apparatus according to claim 11, wherein said plurality of light sources include a long-wave light source and a short-wave light source;

said coupling means has a coupling surface which permits passage of long-wave laser light emanating from said long-wave light source and reflects short-wave laser light emanating from said short-wave light source, to thereby perform coupling operation, and said coupling means guides, to said light receiving means, laser light of said long-wave laser light reflected from said coupling surface and/or laser of said short-wave laser light having passed through said coupling surface.

14. The optical disk apparatus according to claim 11, wherein said plurality of light sources include a first light source for emitting laser light of wavelength $\lambda 1$, a second light source for emitting laser light of wavelength $\lambda 2$, and a third light source for emitting laser light of wavelength $\lambda 3$ ($\lambda 1 > \lambda 2 > \lambda 3$);

said coupling means is formed from first and second coupling means;

said first coupling means has a first coupling surface which permits passage of said laser light of wavelength $\lambda 1$ emanating from said first light source and reflects said laser light of wavelength $\lambda 2$ emanating from said second light source, to thereby perform coupling operation, and said first coupling means guides, to said light receiving means, laser light of said laser light of wavelength $\lambda 1$ reflected from said first coupling surface and/or laser light of said laser light of wavelength $\lambda 2$ having passed through said first coupling surface; and said second coupling means has a second coupling surface which permits passage of said laser light emanating from said first or second light source and which reflects said laser light of wavelength $\lambda 3$ emanating from said third light source, to thereby perform coupling operation, and said second coupling means guides, to said light receiving means, laser light of said laser light of wavelength $\lambda 3$ having passed through said second coupling surface.

15. The optical disk apparatus according to claim 11, wherein said plurality of light sources include a first light source for emitting laser light of wavelength $\lambda 1$, a second light source for emitting laser light of wavelength $\lambda 2$, and a third light source for emitting laser light of wavelength $\lambda 3$ ($\lambda 1 > \lambda 2 > \lambda 3$);

said light receiving means includes first and second light receiving means;

said coupling means is formed from first and second coupling means;

said first coupling means has a first coupling surface which permits passage of said laser light of wavelength $\lambda 1$ emanating from said first light source and reflects said laser light of wavelength $\lambda 2$ emanating from said second light source, to thereby perform coupling operation, and said first coupling means guides, to said first light receiving means, laser light of said laser light of wavelength $\lambda 1$ reflected from said first coupling surface and/or laser light of said laser light of wavelength $\lambda 2$ having passed through said first coupling surface; and said second coupling means has a second coupling surface which permits passage of said laser light emanating from said first or second light source and which reflects said laser light of wavelength $\lambda 3$ emanating from said third light source, to thereby perform coupling operation, and said second coupling means guides, to said second light receiving means, laser light of said laser light of wavelength $\lambda 3$ having passed through said second coupling surface.

16. The optical disk apparatus according to claim 11, wherein said plurality of light sources include a light source for a CD and a light source for a DVD; and said coupling means has a coupling surface which reflects laser light for a CD emanating from said CD light source and permits passage of laser light for a DVD emanating from said DVD light source, to thereby perform coupling operation, and said coupling means guides, to said light receiving means, laser light of the CD laser light having passed through said coupling surface and/or laser light of the DVD laser light reflected from said coupling surface.

17. The optical disk apparatus according to claim 11, wherein said plurality of light sources include a long-wave light source and a short-wave light source; and said coupling means has a coupling surface which reflects long-wave laser light emanating from said long-wave light source and permits passage of short-wave laser light emanating from said short-wave light source, to thereby perform coupling operation, and said coupling means guides, to said light receiving means, laser light of said long-wave laser light having passed through said coupling surface and/or laser light of said short-wave laser light reflected from said coupling surface.

* * * * *